(12) United States Patent
Abe et al.

(10) Patent No.: US 8,673,508 B2
(45) Date of Patent: Mar. 18, 2014

(54) NONAQUEOUS ELECTROLYTE FOR LITHIUM BATTERY AND LITHIUM BATTERY USING SAME

(75) Inventors: Koji Abe, Ube (JP); Kazuhiro Miyoshi, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 470 days.

(21) Appl. No.: 12/935,691

(22) PCT Filed: Mar. 18, 2009

(86) PCT No.: PCT/JP2009/055245
§ 371 (c)(1),
(2), (4) Date: Oct. 26, 2010

(87) PCT Pub. No.: WO2009/122908
PCT Pub. Date: Oct. 8, 2009

(65) Prior Publication Data
US 2011/0045361 A1    Feb. 24, 2011

(30) Foreign Application Priority Data

Apr. 2, 2008  (JP) ................................ 2008-096491

(51) Int. Cl.
*H01M 10/056*  (2010.01)
*H01M 6/14*  (2006.01)

(52) U.S. Cl.
USPC ............................ 429/343; 429/188; 429/324

(58) Field of Classification Search
USPC .......................... 429/343, 331, 188, 338, 342
See application file for complete search history.

(56) References Cited

U.S. PATENT DOCUMENTS

2008/0038644 A1 *   2/2008   Abe et al. ...................... 429/331

FOREIGN PATENT DOCUMENTS

| CN | 1961452 A | 5/2007 |
|---|---|---|
| JP | 2000 195545 | 7/2000 |
| JP | 2000 223154 | 8/2000 |
| JP | 2002 100399 | 4/2002 |
| JP | 2007 258101 | 10/2007 |
| JP | 2007 335170 | 12/2007 |
| JP | 2009-152133 A | 7/2009 |

OTHER PUBLICATIONS

International Search Report issued Jun. 30, 2009 in PCT/JP09/055245 filed Mar. 18, 2009.
Chinese Office Action issued Oct. 9, 2012, in China patent application No. 200980110820.3.
Office Action issued Jul. 16, 2013, in Japanese Patent Application No. 2010-505569.

* cited by examiner

*Primary Examiner* — Basia Ridley
*Assistant Examiner* — Caitlin Wilmot
(74) *Attorney, Agent, or Firm* — Oblon, Spivak, McClelland, Maier & Neustadt, L.L.P.

(57) ABSTRACT

A nonaqueous electrolytic solution for lithium battery comprises an electrolyte salt dissolved in a nonaqueous solvent and contains a carboxylate compound represented by the following general formula (I) in an amount of from 0.01 to 10% by mass of the nonaqueous electrolytic solution.

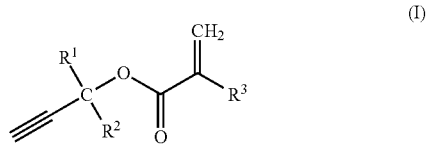

(In the formula $R^1$ and $R^2$ each independently represent a hydrogen atom, or an alkyl group having from 1 to 6 carbon atoms; $R^3$ represents a hydrogen atom, a methyl group, or a group —$CH_2CO_2CR^1R^2C{\equiv}CH$ ($R^1$ and $R^2$ have the same meaning as above).) A lithium battery uses the nonaqueous electrolytic solution having excellent cycle property and storage property.

21 Claims, No Drawings

NONAQUEOUS ELECTROLYTE FOR LITHIUM BATTERY AND LITHIUM BATTERY USING SAME

CROSS REFERENCE TO RELATED APPLICATION

This application is a 371 of PCT/JP2009/055245, filed on Mar. 18, 2009, and claims priority to Japanese Patent Application No. 2008-096491, filed on Apr. 2, 2008.

TECHNICAL FIELD

The present invention relates to a nonaqueous electrolytic solution for lithium battery, and to a lithium battery using it.

BACKGROUND ART

In recent years, lithium secondary batteries have been widely used as power supplies for downsized electronic devices such as mobile telephones, notebook-size personal computers and the like, and also as power supplies for electric vehicles and for electric power storage, etc. In use for mobile communications as mobile telephones, notebook-size personal computers and the like, the requirements for technical evolution for the capacity, the cycle property and the storage property of lithium secondary batteries to be in electronic devices are being increasing more and more with the increase in the consumption power posed by the technical evolution for multiperformance and multifunction of electronic devices.

In electric vehicles, when the power density of lithium secondary batteries is small, then the number of the necessary batteries must be accordingly increased to attain the intended power; and therefore, in these, it is desired to increase and enhance the capacity and the cycle property of the lithium secondary batteries to be held therein, and in addition, the batteries are further required to maintain the battery characteristics under severe conditions.

To satisfy these requirements, lithium secondary batteries are being much improved for increased capacity and elevated voltage thereof, which, however, could increase the electrochemical reaction inside the battery, therefore causing a problem of gas generation through decomposition of the nonaqueous electrolytic solution in the interface between the positive electrode and the negative electrode therein during charge-discharge cycles or high-temperature storage. The gas generation may bring about other problems of lithium ion movement retardation and cycle property degradation, and even battery body swelling during storage.

As a lithium primary battery, for example, there is known a lithium primary battery comprising manganese dioxide or graphite fluoride as the positive electrode and a lithium metal as the negative electrode, and this is widely used as having a high energy density. It is desired to inhibit the increase in the internal resistance of the battery during long-term storage and to improve the long-term storability thereof at high temperatures.

Recently, further, as a novel power source for electric vehicles or hybrid electric vehicles, electric storage devices have been developed, for example, an electric double layer capacitor using activated carbon or the like as the electrode from the viewpoint of the output density thereof, and a so-called hybrid capacitor comprising a combination of the electric storage principle of a lithium ion secondary battery and that of an electric double layer capacitor (asymmetric capacitor utilizing both the capacity by lithium absorption and release and the electric double layer capacity) from the viewpoint of both the energy density and the output density thereof; and it is desired to improve the battery performance, especially the high-temperature cycle property and the high-temperature storage property of these capacitors.

Patent Reference 1 discloses a lithium secondary battery using a nonaqueous electrolytic solution with a compound such as dimethyl itaconate or the like added thereto, showing the excellent cycle property and storage property of the battery with the compound added thereto, as compared with a case with no addition of the compound thereto.

Patent Reference 2 discloses a lithium secondary battery using a nonaqueous electrolytic solution to which is added a combination of methyl acetate as a saturated linear carboxylate and vinyl acrylate as an unsaturated carboxylate, showing the excellent cycle property of the battery with vinyl acrylate added thereto, as compared with a case with no addition of vinyl acrylate thereto.

Patent Reference 3 discloses a lithium secondary battery comprising spinel-type lithium manganate as the positive electrode active material and using a nonaqueous electrolytic solution with a compound such as vinyl methacrylate, vinyl acetate, ethyl acrylate or the like added thereto, showing the excellent cycle property and storage property of the compound with the compound added thereto, as compared with a case with no addition of the compound thereto.

However, even though the compounds described in Patent References 1 to 3 are added, the cycle property and the storage property are not as yet sufficiently satisfactory.

[Patent Reference 1] JP-A 2007-258101
[Patent Reference 2] JP-A 2007-335170
[Patent Reference 3] JP-A 2000-223154

DISCLOSURE OF THE INVENTION

Problems that the Invention is to Solve

An object of the present invention is to provide a nonaqueous electrolytic solution for lithium battery having excellent cycle property and storage property and to provide a lithium battery using it.

Means for Solving the Problems

The present inventors have assiduously studied for the purpose of solving the above-mentioned problems and, as a result, have found that, in a nonaqueous electrolytic solution containing an electrolyte salt dissolved in a nonaqueous solvent, when a carboxylate compound having a carbon-carbon double bond in the chemical structure and having a triple bond in the ester structure moiety thereof, such as di(2-propynyl) itaconate or the like, is added to the nonaqueous electrolytic solution, then the cycle property and the storage property can be improved, and have completed the present invention.

Specifically, the present invention provides the following (1) and (2):

(1) A nonaqueous electrolytic solution for lithium battery comprising an electrolyte salt dissolved in a nonaqueous solvent, which contains a carboxylate compound represented by the following general formula (I) in an amount of from 0.01 to 10% by mass of the nonaqueous electrolytic solution:

[Formula 1]

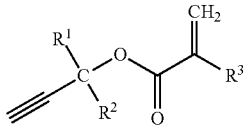

(I)

(wherein $R^1$ and $R^2$ each independently represent a hydrogen atom, or an alkyl group having from 1 to 6 carbon atoms; $R^3$ represents a hydrogen atom, a methyl group, or a group —$CH_2CO_2CR^1R^2C{\equiv}CH$ ($R^1$ and $R^2$ have the same meaning as above)).

(2) A lithium battery comprising a positive electrode, a negative electrode and a nonaqueous electrolytic solution of an electrolyte salt dissolved in a nonaqueous solvent, wherein the nonaqueous electrolytic solution contains a carboxylate compound represented by the above-mentioned general formula (I) in an amount of from 0.01 to 10% by mass of the nonaqueous electrolytic solution.

Advantage of the Invention

The lithium battery using the nonaqueous electrolytic solution of the present invention exhibits good battery performance of excellent cycle property and storage property.

BEST MODE FOR CARRYING OUT THE INVENTION

[Nonaqueous Electrolytic Solution]

The carboxylate compound contained in the nonaqueous electrolytic solution of the present invention is represented by the following formula (I):

[Formula 2]

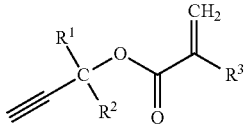

(I)

In the general formula (I), $R^1$ and $R^2$ each independently represent a hydrogen atom, or an alkyl group having from 1 to 6 carbon atoms.

The alkyl group having from 1 to 6 carbon atoms includes a methyl group, an ethyl group, a propyl group, a butyl group, a pentyl group, a hexyl group, etc. Of those, $R^1$ and $R^2$ each are preferably a hydrogen atom or a methyl group, most preferably a hydrogen atom.

$R^3$ in the general formula (I) represents a hydrogen atom, a methyl group, or a group —$CH_2CO_2CR^1R^2C{\equiv}CH$ ($R^1$ and $R^2$ have the same meaning as above).

The carboxylate compound represented by the general formula (I) includes alkynyl acrylates, alkynyl methacrylate, dialkynyl itaconates, etc.

Specific examples of the alkynyl acrylates include 2-propynyl acrylate (same as propargyl acrylate), 1-methyl-2-propynyl acrylate, 1,1-dimethyl-2-propynyl acrylate, etc.; and specific examples of the alkynyl methacrylates include 2-propynyl methacrylate (same as propargyl methacrylate), 1-methyl-2-propynyl methacrylate, 1,1-dimethyl-2-propynyl methacrylate, etc.

Specific examples of the dialkynyl itaconates include di(2-propynyl)itaconate, di(1-methyl-2-propynyl)itaconate, di(1,1-dimethyl-2-propynyl)itaconate, etc.

Of those, preferred are one or more selected from 2-propynyl acrylate, 2-propynyl methacrylate and di(2-propynyl) itaconate.

Adding the carboxylate compound improves both the cycle property and the storage property. Though not clear, the reason may be because the carboxylate compound having a carbon-carbon double bond in the chemical structure and having a triple bond in the ester structure moiety thereof could form a tough and dense surface film simultaneously on both the negative electrode and the positive electrode, and therefore could inhibit solvent decomposition on the negative electrode and the positive electrode. However, since direct oxidative decomposition of the carboxylate compound could not be observed on the positive electrode, it may be presumed that, first a tough and dense surface film could be formed on the negative electrode through reductive decomposition of the carboxylate compound thereon, and thereafter the decomposed product formed through the decomposition of the carboxylate compound could unexpectedly from a tough and dense surface film also on the positive electrode.

Of the carboxylate compounds represented by the general formula (I), those having a triple bond at two sites could exhibit more intensely the effect thereof of improving the cycle property and the storage property than those having a triple bond only in one site in the ester moiety; and therefore, di(2-propynyl)itaconate is especially preferred here. On the other hand, vinyl acrylate is a compound having a double bond in the ester moiety and on the carbon chain to which the ester bonds; however, this undergoes reductive decomposition associated with polymerization, and therefore this could form a rough surface film only on the negative electrode, and has no effect of improving cycle property. In addition, vinyl acrylate has a low oxidation potential by itself, the compound itself is readily decomposed on the positive electrode and could not exhibit the effect of improving storage property.

[Nonaqueous Electrolytic Solution]

The nonaqueous electrolytic solution of the present invention comprises an electrolyte salt dissolved in a nonaqueous solvent, and contains, as added thereto, a carboxylate compound represented by the above-mentioned general formula (I) in an amount of from 0.01 to 10% by mass of the nonaqueous electrolytic solution.

Regarding the amount of the carboxylate compound represented by the general formula (I) in the nonaqueous electrolytic solution of the present invention, when the amount is more than 10% by mass, then the surface film may be formed too excessively on the electrode and therefore, the cycle property and the storage property may be rather worsened; but when the amount is less than 0.01% by mass, the surface film could not be formed sufficiently, and therefore the compound would be ineffective for improving the cycle property and the storage property. Accordingly, the lowermost limit of the content of the compound is preferably at least 0.01% by mass of the nonaqueous electrolytic solution, more preferably at least 0.05% by mass, even more preferably at least 0.1% by mass, most preferably at least 0.3% by mass. Its uppermost limit is preferably at most 10% by mass, more preferably at most 7% by mass, even more preferably at most 5% by mass, most preferably at most 3% by mass.

[Nonaqueous Solvent]

The nonaqueous solvent for use in the nonaqueous electrolytic solution of the present invention includes cyclic carbonates, linear carbonates, linear esters, ethers, amides, phosphates, sulfones, lactones, nitriles, S=O bond-containing compounds, etc.

The cyclic carbonates include ethylene carbonate (EC), propylene carbonate (PC), butylene carbonate (BC), 4-fluoro-1,3-dioxolan-2-one (FEC), trans or cis-4,5-difluoro-1,3-dioxolan-2-one (hereinafter the two are collectively referred to as "DFEC"), vinylene carbonate (VC), vinylethylene carbonate (VEC), etc. Of those cyclic carbonates, use of at least one cyclic carbonate having a double bond or a fluorine atom is preferred as the cycle property and the storage property could be improved more; and use of both a double bond-having cyclic carbonate and a fluorine-containing cyclic carbonate is more preferred. As the double bond-having cyclic carbonate, VC and VEC are preferred; and as the fluorine-containing cyclic carbonate, FEC and DFEC are preferred.

One type of those solvents may be used, but using from two to four different types as combined is preferred as improving more the cycle property and the storage property. Preferred combinations of the cyclic carbonates include EC and VC; PC and VC; FEC and VC; FEC and EC; FEC and PC; EC and PC and VC; EC and FEC and VC; FEC and PC and VC; FEC and EC and PC and VC; etc.

Not specifically defined, the content of the cyclic carbonate is preferably from 10% by volume to 40% by volume relative to the total volume of the nonaqueous solvent. When the content is less than 10% by volume, then the conductivity of the nonaqueous electrolytic solution may lower and the cycle property may be thereby worsened; but when more than 40% by volume, then the nonaqueous electrolytic solution may decomposed excessively to generate a gas whereby the storage property may be worsened. Accordingly, the above range is preferred.

The linear carbonates include asymmetric linear carbonates such as methyl ethyl carbonate (MEC), methyl propyl carbonate, methyl isopropyl carbonate, methyl butyl carbonate, ethyl propyl carbonate, etc.; symmetric linear carbonates such as dimethyl carbonate (DMC), diethyl carbonate (DEC), dipropyl carbonate, dibutyl carbonate, etc. In particular, the asymmetric carbonates are preferred, as effectively improving the cycle property. One type of those solvents may be used, but using two or more different types as combined is preferred as improving more the cycle property and the storage property.

Not specifically defined, the content of the linear carbonate is preferably from 60 to 90% by volume relative to the total volume of the nonaqueous solvent. When the content is less than 60% by volume, then the viscosity of the nonaqueous electrolytic solution may increase and the cycle property may worsen; but when more than 90% by volume, then the electric conductivity of the nonaqueous electrolytic solution may lower and the cycle property may worsen. Accordingly, the above range is preferred.

The linear esters include methyl propionate, ethyl propionate, methyl acetate, ethyl acetate, methyl pivalate, butyl pivalate, hexyl pivalate, octyl pivalate, dimethyl oxalate, ethyl methyl oxalate, diethyl oxalate, etc. The ethers include tetrahydrofuran, 2-methyltetrahydrofuran, 1,3-dioxane, 1,4-dioxane, 1,2-dimethoxyethane, 1,2-diethoxyethane, 1,2-dibutoxyethane, etc.

The amides include dimethylformamide, etc.; the phosphates include trimethyl phosphate, tributyl phosphate, trioctyl phosphate, etc.; the sulfones include sulfolane, etc.; the lactones include γ-butyrolactone, γ-valerolactone, α-angelicalactone, etc.; the nitriles include acetonitrile, propionitrile, succinonitrile, glutaronitrile, adiponitrile, etc.

Adding linear esters, ethers, amides or phosphates reduces the viscosity of the nonaqueous electrolytic solution and therefore improves the battery characteristics such as the output density, etc.; adding sulfones or lactones is effective for making the nonaqueous electrolytic solution flame-retardant; and adding nitriles tends to enhance the storage property.

The S=O bond-containing compounds include 1,3-propanesultone (PS), ethylene sulfite, hexahydrobenzo[1,3,2]dioxathiolan-2-oxide (namely, 1,2-cyclohexanediol cyclic sulfite), 5-vinyl-hexahydro-1,3,2-benzodioxathiol-2-oxide, 1,4-butanediol dimethanesulfonate, 1,3-butanediol dimethanesulfonate, divinyl sulfone, 1,2-bis(vinylsulfonyl)ethane, bis(2-vinylsulfonylethyl) ether, etc.

Using S=O bond-containing compounds as combined with the carboxylate compound represented by the general formula (I) is favorable as enhancing more the storage property.

Regarding the content of the S=O bond-containing compound, when the content thereof is more than 10% by mass, then the cycle property may worsen; but when less than 0.01% by mass, the effect of improving the storage property could not be sufficiently attained. Accordingly, the lowermost limit of the content of the S=O bond-containing compound is preferably at least 0.01% by mass of the nonaqueous electrolytic solution, more preferably at least 0.1% by mass, even more preferably at least 0.5% by mass. The uppermost limit of the content is preferably at most 10% by mass, more preferably at most 5% by mass, even more preferably at most 3% by mass.

In general, the nonaqueous solvents are used as a mixture thereof for attaining the suitable physical properties. Regarding their combinations, for example, there are mentioned a combination of a cyclic carbonate and a linear carbonate, a combination of a cyclic carbonate, a linear carbonate and a lactone, a combination of a cyclic carbonate, a linear carbonate and an ether, a combination of a cyclic carbonate, a linear carbonate and a linear ester, a combination of a cyclic carbonate, a linear carbonate and a nitrile, a combination of a cyclic carbonate, a linear carbonate and an S=O bond-containing compound, etc.

Of those, preferred is using a nonaqueous solvent of a combination of at least a cyclic carbonate and a linear carbonate, as effectively improving the cycle property. The ratio (by volume) of cyclic carbonate/linear carbonate is preferably from 10/90 to 40/60, more preferably from 15/85 to 35/65, even more preferably from 20/80 to 30/70.

[Electrolyte Salt]

The electrolyte salt for use in the present invention includes lithium salts such as $LiPF_6$, $LiBF_4$, $LiClO_4$, etc.; linear alkyl group-having lithium salts such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, etc.; cyclic alkylene chain-having lithium salts such as $(CF_2)_2(SO_2)_2NLi$, $(CF_2)_3(SO_2)_2NLi$, etc.; and lithium salts with an anion of an oxalate complex such as lithium bis[oxalate-O,O']borate, lithium difluoro[oxalate-O,O']borate, etc. Of those, especially preferred electrolyte salts are $LiPF_6$, $LiBF_4$, $LiN(SO_2CF_3)_2$, $LiN(SO_2C_2F_5)_2$; and most preferred electrolyte salts are $LiPF_6$, $LiBF_4$ and $LiN(SO_2CF_3)_2$. One or more of these electrolyte salts may be used herein either singly or as combined.

A preferred combination of these electrolyte salts is a combination containing $LiPF_6$ as combined with at least one selected from $LiBF_4$, $LiN(SO_2CF_3)_2$ and $LiN(SO_2C_2F_5)_2$.

Preferred are a combination of $LiPF_6$ and $LiBF_4$; a combination of $LiPF_6$ and $LiN(SO_2CF_3)_2$: a combination of $LiPF_6$ and $LiN(SO_2C_2F_5)_2$, etc.

When the ratio (by mol) of $LiPF_6/[LiBF_4$ or $LiN(SO_2CF_3)_2$ or $LiN(SO_2C_2F_2)_2]$ is smaller than 70/30 in point of the proportion of $LiPF_6$, or when the ratio is larger than 99/1 in point of the proportion of $LiPF_6$, then the cycle property and the storage property may worsen. Accordingly, the ratio (by mol) of $LiPF_6/[LiBF_4$ or $LiN(SO_2CF_3)_2$ or $LiN(SO_2C_2F_5)_2]$ is preferably within a range of from 70/30 to 99/1, more preferably from 80/20 to 98/2. The combination falling within the above range is more effective for bettering the cycle property and the storage property.

The electrolyte salts may be combined in any desired ratio. In the combination of $LiPF_6$ with any of $LiBF_4$, $LiN(SO_2CF_3)_2$ and $LiN(SO_2C_2F_5)_2$, when the proportion (as molar fraction) of the other electrolyte salt than those ingredients to the total electrolyte salts is less than 0.01%, then the effect of improving the cycle property and the storage property may be poor; but when it is more than 45%, then the cycle property and the storage property may worsen. Accordingly, the proportion (as molar fraction) is preferably from 0.01 to 45%, more preferably from 0.03 to 20%, even more preferably from 0.05 to 10%, most preferably from 0.05 to 5%.

The concentration of all these electrolyte salts as dissolved in the solution is generally preferably at least 0.3 M relative to the above-mentioned nonaqueous solvent, more preferably at least 0.5 M, most preferably at least 0.7 M. The uppermost limit of the concentration is preferably at most 2.5 M, more preferably at most 2.0 M, even more preferably at most 1.5 M.

As the electrolyte for electric double layer capacitors, usable are known quaternary ammonium salts such as tetraethylammonium tetrafluoroborate, triethylmethylammonium tetrafluoroborate, tetraethylammonium hexafluorophosphate, etc.

[Other Additives]

An aromatic compound may be added to the nonaqueous electrolytic solution of the present invention, thereby securing the safety of the battery in overcharging. Preferred examples of the aromatic compound include cyclohexylbenzene, fluorocyclohexylbenzene compound (1-fluoro-2-cyclohexylbenzene, 1-fluoro-3-cyclohexylbenzene, 1-fluoro-4-cyclohexylbenzene), tert-butylbenzene, tert-amylbenzene, 1-fluoro-4-tert-butylbenzene, 1,3-di-tert-butylbenzene, biphenyl, terphenyl (o-, m-, p-form), diphenyl ether, fluorobenzene, difluorobenzene (o-, m-, p-form), 2,4-difluoroanisole, partially hydrogenated terphenyl (1,2-dicyclohexylbenzene, 2-phenylbicyclohexyl, 1,2-diphenylcyclohexane, o-cyclohexylbiphenyl), etc. One or more of these compounds may be used herein either singly or as combined.

[Production of Nonaqueous Electrolytic Solution]

The nonaqueous electrolytic solution of the present invention can be produced, for example, by mixing the above-mentioned nonaqueous solvents followed by dissolving therein the above-mentioned electrolyte salt and the carboxylate compound represented by the general formula (I) in an amount of from 0.01 to 10% by mass of the resulting nonaqueous electrolytic solution.

In this case, the nonaqueous solvent to be used and the carboxylate compound to be added to the electrolytic solution are preferably previously purified within a range not significantly detracting from the producibility, in which, therefore, the impurity content is preferably as low as possible.

The nonaqueous electrolytic solution of the present invention is favorably used for the electrolytic solution for lithium primary batteries and lithium secondary batteries. Further, the nonaqueous electrolytic solution of the present invention is also usable as an electrolytic solution for electric double layer capacitors or as an electrolytic solution for hybrid capacitors. Of those, the nonaqueous electrolytic solution of the present invention is most favorable for lithium secondary batteries.

[Lithium Battery]

The lithium battery of the present invention collectively includes a lithium primary battery and a lithium secondary battery, comprising a positive electrode, a negative electrode and the above-mentioned nonaqueous electrolytic solution of an electrolyte salt dissolved in a nonaqueous solvent, wherein a carboxylate compound represented by the above-mentioned general formula (I) is in the nonaqueous electrolytic solution in an amount of from 0.01 to 10% by mass of the nonaqueous electrolytic solution.

In the lithium battery of the present invention, the other constitutive components such as a positive electrode and a negative electrode except for the nonaqueous electrolytic solution can be used with no limitation.

For example, as the positive electrode active material for lithium secondary battery, usable are complex metal oxides of lithium containing any of cobalt, manganese or nickel. One or more such positive electrode active materials may be used either singly or as combined.

The complex metal oxides include, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$, etc. Combinations of $LiCoO_2$ and $LiMn_2O_4$; $LiCoO_2$ and $LiNiO_2$; $LiMn_2O_4$ and $LiNiO_2$ are acceptable herein.

For enhancing the safety in overcharging or enhancing the cycle property or for enabling the use of the battery at a charging potential of 4.3 V or more, the lithium complex oxide may be partly substituted with any other element. For example, a part of cobalt, manganese and nickel may be substituted with at least one element of Sn, Mg, Fe, Ti, Al, Zr, Cr, V, Ga, Zn, Cu, Bi, Mo, La, etc.; or O may be partly substituted with S or F; or the oxide may be coated with a compound containing such other element.

Of those, preferred are lithium complex metal oxides such as $LiCoO_2$, $LiMn_2O_4$ and $LiNiO_2$, with which the positive electrode charging potential in a fully charged state may be 4.3 V or more, based on Li. More preferred are lithium complex oxides usable at 4.4 V or more, such as $LiCo_{1-x}M_xO_2$ (where M is at least one element of Sn, Mg, Fe, Ti, Al, Zr, Cr, V, Ga, Zn and Cu; 0.001≤x≤0.05), $LiCo_{1/3}Ni_{1/3}Mn_{1/3}O_2$, and $LiNi_{1/2}Mn_{3/2}O_4$. A lithium transition metal composite oxide used in higher charged voltage charge batteries may generate a gas through reaction with a nonaqueous electrolytic solution therein during charging; however, in the lithium secondary battery of the present invention, such gas generation can be prevented.

Further, lithium-containing olivine-type phosphates are also usable as the positive electrode active material. Their concrete examples include $LiFePO_4$, $LiCoPO_4$, $LiNiPO_4$, $LiMnPO_4$, etc.

The lithium-containing olivine-type phosphates may be partly substituted with any other element. For example, apart of iron, cobalt, nickel and manganese therein may be substituted with at least one element selected from Co, Mn, Ni, Mg, Al, B, Ti, V, Nb, Cu, Zn, Mo, Ca, Sr, W and Zr; or the phosphates may be coated with a compound containing any of these other elements or with a carbon material. Of those, preferred are $LiFePO_4$ and $LiMnPO_4$.

The lithium-containing olivine-type phosphate may be combined with, for example, the above-mentioned positive electrode active material.

Not specifically defined, the electroconductive agent of the positive electrode may be any electron-transmitting material not undergoing chemical change. For example, it includes graphites such as natural graphite (flaky graphite, etc.), artificial graphite, etc.; carbon blacks such as acetylene black, Ketjen black, channel black, furnace black, lamp black, thermal black, etc. Graphites and carbon blacks may be combined suitably. The amount of the electroconductive agent to be added to the positive electrode mixture is preferably from 1 to 10% by mass, more preferably from 2 to 5% by mass.

The positive electrode may be formed by mixing the above-mentioned positive electrode active material with an electroconductive agent such as acetylene black, carbon black or the like, and with a binder such as polytetrafluoroethylene (PTFE), polyvinylidene fluoride (PVDF), styrene/butadiene copolymer (SBR), acrylonitrile/butadiene copolymer (NBR), carboxymethyl cellulose (CMC), ethylene/propylene/diene terpolymer or the like, then adding thereto a high-boiling-point solvent such as 1-methyl-2-pyrrolidone or the like, and kneading them to give a positive electrode mixture, thereafter applying the positive electrode mixture onto an aluminium foil or a stainless lath plate or the like serving as a collector, and drying and shaping it under pressure, and then heat-treating it in vacuum at a temperature of from 50° C. to 250° C. or so for about 2 hours.

In the present invention, for enhancing the addition effect of the carboxylate compound represented by the general formula (I), the electrode mixture density is preferably increased. In particular, in case where a complex metal oxide of lithium that contains cobalt, manganese or nickel is used as the positive electrode active material, the density of the positive electrode mixture layer is preferably at least 3.0 g/cm$^3$, more preferably at least 3.2 g/cm$^3$, most preferably at least 3.4 g/cm$^3$. When its uppermost limit is more than 4.0 g/cm$^3$, then the battery production may be substantially difficult, and therefore, the density is preferably at most 4.0 g/cm$^3$.

In case where a lithium-containing olivine-type phosphate is used as the positive electrode active material, the density of the positive electrode mixture layer is preferably at least 1.0 g/cm$^3$, more preferably at least 1.2 g/cm$^3$, most preferably at least 1.4 g/cm$^3$. When its uppermost limit is more than 4.0 g/cm$^3$, then the battery production may be substantially difficult, and therefore, the density is preferably at most 4.0 g/cm$^3$.

For the positive electrode for lithium primary battery, there are mentioned oxides or chalcogen compounds of one or more metal elements such as CuO, Cu$_2$O, Ag$_2$O, Ag$_2$CrO$_4$, CuS, CuSO$_4$, TiO$_2$, TiS$_2$, SiO$_2$, SnO, V$_2$O$_5$, V$_6$O$_{12}$, VO$_x$, Nb$_2$O$_5$, Bi$_2$O$_3$, Bi$_2$Pb$_2$O$_5$, Sb$_2$O$_3$, CrO$_3$, Cr$_2$O$_3$, MoO$_3$, WO$_3$, SeO$_2$, MnO$_2$, Mn$_2$O$_3$, Fe$_2$O$_3$, FeO, Fe$_3$O$_4$, Ni$_2$O$_3$, NiO, CoO$_3$, CoO, etc.; sulfur compounds such as SO$_2$, SOCl$_2$, etc.; carbon fluorides (fluorographite) represented by a general formula (CF$_x$)$_n$, etc. Above all, preferred are MnO$_2$, V$_2$O$_5$, fluorographite, etc.

As the negative electrode active material for lithium secondary battery, usable are one or more of lithium metal, lithium alloys, and carbon materials [graphites such as artificial graphite, natural graphite, etc.], tin, tin compounds, silicon, silicon compounds and the like capable of absorbing and releasing lithium, either singly or as combined.

Of those, preferred are high-crystalline carbon materials such as artificial graphite, natural graphite or the like of which the ability to absorb and release lithium ions is good. More preferred is a carbon material having a graphite-type crystal structure where the lattice (002) spacing (d$_{002}$) is at most 0.340 nm (nanometers), especially from 0.335 to 0.337 nm. More preferably, the high-crystalline carbon material is coated with a low-crystalline carbon material, as capable of preventing gas generation. When such a high-crystalline carbon material is used, then it may react with a nonaqueous electrolytic solution in charging to generate a gas; however, in the lithium secondary battery of the present invention, the reaction can be retarded.

The metal compound capable of absorbing and releasing lithium, serving as a negative electrode active material, includes compounds containing at least one metal element of Si, Ge, Sn, Pb, P, Sb, Bi, Al, Ga, In, Ti, Mn, Fe, Co, Ni, Cu, Zn, Ag, Mg, Sr, Ba, etc. These metal compounds may have any morphology of simple substances, alloys, oxides, nitrides, sulfides, borides, alloys with lithium or the like; but preferred are any of simple substances, alloys, oxides and alloys with lithium, as capable of increasing the battery capacity. Above all, more preferred are those containing at least one element selected from Si, Ge and Sn, and even more preferred are those containing at least one element selected from Si and Sn, as capable of increasing the capacity of the battery.

The negative electrode may be formed, using the same electroconductive agent, binder and high-boiling-point solvent as in the formation of the above-mentioned positive electrode. These are mixed and kneaded to give a negative electrode mixture, then the negative electrode mixture is applied onto a copper foil or the like serving as a collector, then dried and shaped under pressure, and thereafter heat-treated in vacuum at a temperature of from 50° C. to 250° C. or so for about 2 hours.

The density of the negative electrode mixture layer is preferably at least 1.2 g/cm$^3$, more preferably at least 1.4 g/cm$^3$, most preferably at least 1.6 g/cm$^3$. Regarding its uppermost limit, when the density is more than 2.0 g/cm$^3$, then the formation of the layer would be substantially difficult, and therefore, the density is preferably at most 2.0 g/cm$^3$.

As the negative electrode active material for lithium primary battery, usable is a lithium metal or a lithium alloy.

As the separator for battery, usable is a single-layer or laminate porous film of polyolefin such as polypropylene, polyethylene or the like, as well as a woven fabric, a non-woven fabric, etc.

The structure of the lithium secondary battery is not specifically defined. The battery may be a coin-shaped battery, a cylindrical battery, a square-shaped battery, or a laminate-type battery, each having a single-layered or multi-layered separator.

The lithium secondary battery of the present invention exhibits excellent cycle property for a long period of time even when the final charging voltage is 4.2 V or higher and particularly 4.3 V or higher. Furthermore, the cycle property is good even when the final charging voltage is 4.4 V. The final discharging voltage can be 2.5 V or more and further 2.8 V or more. Not specifically defined, the current value may be for constant current discharge of from 0.1 to 15 C. The lithium secondary battery of the present invention may be charged and discharged at −40° C. to 100° C. and preferably at 0° C. to 80° C.

In the present invention, as a countermeasure against the increase in the internal pressure of the lithium, secondary battery, there may be employed a method of providing a safety valve in the battery cap or a method of forming a cutout in the battery component such as the battery can, the gasket or the like. In addition, as a safety countermeasure against overcharging, a current breaker capable of detecting the internal pressure of the battery to cut off the current may be provided in the battery cap.

EXAMPLES

Examples of using the nonaqueous electrolytic solution of the present invention are shown below.

Examples 1 to 4

(1) Preparation of Nonaqueous Electrolytic Solution $LiPF_6$ to be 1 M was dissolved in a nonaqueous solvent of ethylene carbonate (EC)/methyl ethyl carbonate (MEC)/dimethyl carbonate (DMC)=30/35/35 (ratio by volume), and further di(2-propynyl)itaconate was added thereto to prepare a nonaqueous electrolytic solution, in an amount of 0.05% by mass of the resulting nonaqueous electrolytic solution (Example 1), 1% by mass (Example 2), 3% by mass (Example 3) and 7% by mass (Example 4).

(2) Production of Lithium Ion Secondary Battery

94% by mass of $LiCo_{1/3}Mn_{1/3}Ni_{1/3}O_2$ (positive electrode active material) and 3% by mass of acetylene black (electro-conductive agent) were mixed, and added to and mixed with a solution previously prepared by dissolving 3% by mass of polyvinylidene fluoride (binder) in 1-methyl-2-pyrrolidone, thereby preparing a positive electrode mixture paste. The positive electrode mixture paste was applied onto an aluminium foil (collector), dried, processed under pressure and cut into a predetermined size, thereby producing a long rectangular, positive electrode sheet. The density of the positive electrode mixture layer was 3.5 g/cm³.

95% by mass of artificial graphite ($d_{002}$=0.335 nm) (negative electrode active material) was added to and mixed with a solution previously prepared by dissolving 5% by mass of polyvinylidene fluoride (binder) in 1-methyl-2-pyrrolidone, thereby preparing a negative electrode mixture paste. The negative electrode mixture paste was applied onto both surfaces of a copper foil (collector), dried, processed under pressure and cut into a predetermined size, thereby producing a long rectangular, negative electrode sheet. The density of the negative electrode mixture layer was 1.6 g/cm³.

The positive electrode sheet, a porous polyethylene film separator, the negative electrode sheet and a separator were laminated in that order, and the resulting laminate was coiled up. The coil was housed into a nickel-plated, iron-made cylindrical battery can serving also as a negative electrode terminal. Further, the nonaqueous electrolytic solution was injected thereinto, and the can was calked with a battery cap having a positive electrode terminal, via a gasket therebetween, thereby constructing a 18650-type cylindrical battery. The positive electrode terminal was connected to the positive electrode sheet via an aluminium lead tab therebetween; and the negative electrode can was previously connected to the negative electrode sheet inside the battery, via a nickel lead tab therebetween.

(3) Determination of Cycle Property

In a thermostatic chamber kept at 60° C., the battery constructed according to the above-mentioned method was charged up to 4.3 V with a constant current of 1 mA/cm², then charged for 2.5 hours at a constant voltage of 4.3 V, and thereafter this was discharged under a constant current of 1 mA/cm² to a discharge voltage of 3.0 V. This is one cycle. The battery was subjected to 100 cycles. After 100 cycles at 60° C., the discharge capacity retention rate (%) of the battery was determined according to the following formula, and the results are shown in Table 1.

Discharge Capacity Retention Rate (%)=(discharge capacity in 100 cycles/discharge capacity in 1 cycle)×100.

(4) Evaluation of Gas Generation

The battery constructed according to the above-mentioned method was charged up to 4.3 V with a constant current of 1 mA/cm². Then, the battery was charged for 2.5 hours at a constant voltage of 4.3 V and put in a thermostatic chamber at 60° C. and kept in an open circuit state for 20 days, and thereafter the amount of gas generation from the battery was measured according to the Archimedes' method. The gas generation was expressed as a relative value based on the gas generation in Comparative Example 1, 100%. The results are shown in Table 1.

Examples 5 and 6

A nonaqueous electrolytic solution was prepared in the same manner as in Example 2, to which, however, 2-propynyl acrylate (Example 5) or 2-propynyl methacrylate (Example 6) was added in place of di(2-propynyl)itaconate in an amount of 1% by mass of the nonaqueous electrolytic solution. Using the thus-prepared nonaqueous electrolytic solution, a 18650-type cylindrical battery was constructed in the same manner as in Example 1, and the battery characteristics were measured in the same manner as in Example 1. The results are shown in Table 1.

Example 7

$LiPF_6$ to be 1 M and $LiN(SO_2CF_3)_2$ to be 0.05 M were dissolved in a nonaqueous solvent of fluoroethylene carbonate (FEC)/ethylene carbonate (EC)/propylene carbonate (PC)/vinylene carbonate (VC)/methyl ethyl carbonate (MEC)/dimethyl carbonate (DMC)=20/3/5/2/35/35 (ratio by volume), and further di(2-propynyl)itaconate was added thereto in an amount of 1% by mass of the resulting nonaqueous electrolytic solution and 1,3-propanesultone was thereto in an amount of 0.5% by mass, thereby preparing a nonaqueous electrolytic solution. Using the thus-prepared nonaqueous electrolytic solution, a 18650-type cylindrical battery was constructed in the same manner as in Example 1, and the battery characteristics were measured in the same manner as in Example 1. The results are shown in Table 1.

Comparative Example 1

A cylindrical battery was produced in the same manner as in Example 1, for which, however, $LiPF_6$ to be 1 M was dissolved in a nonaqueous solvent of ethylene carbonate (EC)/methyl ethyl carbonate (MEC)/dimethyl carbonate (DMC)=30/35/35 (ratio by volume), but di(2-propynyl)itaconate was not added thereto to prepare the nonaqueous electrolytic solution, and the battery was evaluated. The results are shown in Table 1.

Comparative Examples 2 and 3

$LiPF_6$ to be 1 M and was dissolved in a nonaqueous solvent of ethylene carbonate (EC)/methyl ethyl carbonate (MEC)/dimethyl carbonate (DMC)=30/35/35 (ratio by volume) to prepare a nonaqueous electrolytic solution. Further, in place of di(2-propynyl)itaconate in Example 1, vinyl methacrylate (Comparative Example 2) or dimethyl itaconate (Comparative Example 3) was added thereto in an amount of 1% by mass to prepare a nonaqueous electrolytic solution. Using the thus-prepared nonaqueous electrolytic solution, a 18650-type cylindrical battery was constructed in the same manner as in Example 1, and the battery characteristics were measured in the same manner as in Example 1. The results are shown in Table 1.

TABLE 1

|  | Composition of Electrolyte Salt Composition of Nonaqueous Electrolytic Solution | Compound | Amount Added (% by mass) | Discharge Capacity Retention Rate after 100 cycles (%) | Gas Generation after High-Temperature Storage [Relative Value] (%) |
|---|---|---|---|---|---|
| Example 1 | 1M LiPF6 EC/MEC/DMC (30/35/35) | di(2-propynyl) itaconate | 0.05 | 79 | 80 |
| Example 2 | 1M LiPF6 EC/MEC/DMC (30/35/35) | di(2-propynyl) itaconate | 1 | 84 | 69 |
| Example 3 | 1M LiPF6 EC/MEC/DMC (30/35/35) | di(2-propynyl) itaconate | 3 | 84 | 73 |
| Example 4 | 1M LiPF6 EC/MEC/DMC (30/35/35) | di(2-propynyl) itaconate | 7 | 83 | 75 |
| Example 5 | 1M LiPF6 EC/MEC/DMC (30/35/35) | (2-propynyl) acrylate | 1 | 79 | 75 |
| Example 6 | 1M LiPF6 EC/MEC/DMC (30/35/35) | (2-propynyl) meth acrylate | 1 | 80 | 73 |
| Example 7 | 1M LiPF6 + 0.05M LiN(SO2CF3)2 FEC/EC/PC/VC/MEC/DMC (20/3/5/2/35/35) + 1,3-propanesultone (0.5 wt %) | di(2-propynyl) itaconate | 1 | 89 | 65 |
| Comparative Example 1 | 1M LiPF6 EC/MEC/DMC (30/35/35) | none |  | 67 | 100 |
| Comparative Example 2 | 1M LiPF6 EC/MEC/DMC (30/35/35) | vinyl methacrylate | 1 | 66 | 103 |
| Comparative Example 3 | 1M LiPF6 EC/MEC/DMC (30/35/35) | dimethyl itaconate | 1 | 69 | 97 |

From Table 1, it is known that the lithium secondary batteries of Examples 1 to 7, to which a carboxylate compound having a triple bond was added, all had improved cycle property and storage property, as compared with the lithium secondary batteries of Comparative Example 1, to which the compound was not added, and of Comparative Example 2 and 3, to which a compound not having a triple bond was added.

Example 8

A positive electrode sheet was produced using LiFePO$_4$ (positive electrode active material) in place of the positive electrode active material in Example 2. A cylindrical battery was constructed in the same manner as in Example 2 except for the following: 90% by mass of LiFePO$_4$ and 5% by mass of acetylene black (electroconductive agent) were mixed, and added to and mixed with a solution previously prepared by dissolving 5% by mass of polyvinylidene fluoride (binder) in 1-methyl-2-pyrrolidone, thereby preparing a positive electrode mixture paste, the positive electrode mixture paste was applied onto an aluminium foil (collector), dried, processed under pressure and cut into a predetermined size, thereby producing a long rectangular, positive electrode sheet, the final charging voltage was 3.6 V, and the final discharging voltage was 2.0 V. The battery was evaluated. The results are shown in Table 2. The density of the positive electrode mixture layer was 1.5 g/cm$^3$.

Comparative Example 4

A cylindrical battery was produced in the same manner as in Example 8, for which, however, di(2-propynyl)itaconate was not added to the nonaqueous electrolytic solution, and the battery was evaluated. The results are shown in Table 2.

TABLE 2

|  | Composition of Electrolyte Salt Composition of Nonaqueous Electrolytic Solution | Compound | Amount Added (% by mass) | Discharge Capacity Retention Rate after 100 cycles (%) | Gas Generation after High-Temperature Storage [Relative Value] (%) |
|---|---|---|---|---|---|
| Example 8 | 1M LiPF6 EC/MEC/DMC (30/35/35) | di(2-propynyl) itaconate | 1 | 88 | 68 |
| Comparative Example 4 | 1M LiPF6 EC/MEC/DMC (30/35/35) | none | 1 | 78 | 100 |

Example 9

A negative electrode sheet was produced using Si (negative electrode active material) in place of the negative electrode active material in Example 2. A cylindrical battery was constructed in the same manner as in Example 2 except for the following: 80% by mass of Si and 15% by mass of acetylene black (electroconductive agent) were mixed, and added to and mixed with a solution previously prepared by dissolving 5% by mass of polyvinylidene fluoride (binder) in 1-methyl-2-pyrrolidone, thereby preparing a negative electrode mixture paste, the negative electrode mixture paste was applied onto a copper foil (collector), dried, processed under pressure and cut into a predetermined size, thereby producing a long rectangular, negative electrode sheet. The battery was evaluated. The results are shown in Table 3. The density of the negative electrode mixture layer was 1.6 g/cm³.

Comparative Example 5

A cylindrical battery was produced in the same manner as in Example 9, for which, however, di(2-propynyl)itaconate was not added to the nonaqueous electrolytic solution, and the battery was evaluated. The results are shown in Table 3.

TABLE 3

| | Composition of Electrolyte Salt Composition of Nonaqueous Electrolytic Solution | Compound | Amount Added (% by mass) | Discharge Capacity Retention Rate after 100 cycles (%) | Gas Generation after High-Temperature Storage [Relative Value] (%) |
|---|---|---|---|---|---|
| Example 9 | 1M LiPF6 EC/MEC/DMC (30/35/35) | di(2-propynyl) itaconate | 1 | 66 | 67 |
| Comparative 5 | 1M LiPF6 EC/MEC/DMC (30/35/35) | none | 1 | 25 | 100 |

As in Table 2 (comparison between Example 8 and Comparative Example 4) and Table 3 (comparison between Example and Comparative Example 5), the case where a lithium-containing olivine-type iron phosphate is used as the positive electrode (Example 8) and the case where Si was used as the negative electrode (Example 9) both exhibited the same effect as in Examples 1 to 7, and it is known that the effect of the present invention does not depend on a specific positive electrode or negative electrode.

In addition, it has been confirmed that the lithium primary battery comprising the nonaqueous electrolytic solution of the present invention has excellent long-term storage property at high temperatures.

INDUSTRIAL APPLICABILITY

The lithium battery comprising the nonaqueous electrolytic solution of the present invention has excellent cycle property and storage property and can maintain excellent battery performance for a long period of time.

The invention claimed is:

1. A nonaqueous electrolytic solution for a lithium battery, comprising:
   a nonaqueous solvent,
   an electrolyte salt, and
   a carboxylate compound represented by formula (I):

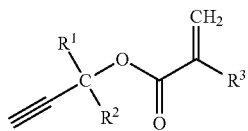

(I)

wherein
   each of $R^1$ and $R^2$, independently, represents a hydrogen atom, or an alkyl group having from 1 to 6 carbon atoms; $R^3$ represents a hydrogen atom, a methyl group, or a —$CH_2CO_2CR^{1'}R^{2'}C\equiv CH$ group where each of $R^{1'}$ and $R^{2'}$, independently, represents a hydrogen atom, or an alkyl group having from 1 to 6 carbon atoms;
   said electrolyte salt and said carboxylate compound represented by formula (I) are present in the nonaqueous solution in dissolved form; and
   said carboxylate compound represented by formula (I) is present in the nonaqueous solvent in an amount of from 0.01 to 10% by mass, relative to the mass of the nonaqueous electrolyte solution.

2. The nonaqueous electrolytic solution for lithium battery according to claim 1, wherein
   said carboxylate compound represented by formula (I) comprises at least one member selected from the group consisting of di(2-propynyl)itaconate; 2-propynyl acrylate; 2-propynyl methacrylate; and 2-propynyl crotonate.

3. The nonaqueous electrolytic solution for lithium battery according to claim 1, wherein the nonaqueous solvent further comprises an asymmetric linear carbonate, a symmetric linear carbonate, or a combination of an asymmetric linear carbonate and a symmetric linear carbonate.

4. The nonaqueous electrolytic solution for lithium battery according to claim 3, wherein the nonaqueous solvent further comprises an asymmetric linear carbonate.

5. The nonaqueous electrolytic solution for lithium battery according to claim 4, wherein the asymmetric linear carbonate comprises at least one member selected from the group consisting of methyl ethyl carbonate; methyl propyl carbonate; methyl isopropyl carbonate; methyl butyl carbonate; and ethyl propyl carbonate.

6. The nonaqueous electrolytic solution for lithium battery according to claim 1, wherein the nonaqueous solvent comprises from two to four cyclic carbonates.

7. The nonaqueous electrolytic solution for lithium battery according to claim 6, wherein
   each cyclic carbonate is at least one member selected from the group consisting of ethylene carbonate; propylene carbonate; butylene carbonate; 4-fluoro-1,3-dioxolan-2-one; trans-4,5-difluoro-1,3-dioxolan-2-one; cis-4,5-difluoro-1,3-dioxolan-2-one; vinylene carbonate; and vinylethylene carbonate, provided that each cyclic carbonate is not the same.

8. The nonaqueous electrolytic solution for lithium battery according to claim 7, wherein the cyclic carbonates comprises both a double bond-having cyclic carbonate and a fluorine-containing cyclic carbonate.

9. The nonaqueous electrolytic solution for lithium battery according to claim 1, wherein
   said electrolyte salt comprises LiPF6 and at least one member selected from the group consisting of LiBE₄, LiN(SO₂CF₃)₂ and LiN(SO₂C₂F₅)₂.

10. The nonaqueous electrolytic solution for lithium battery according to claim 9, wherein the molar ratio of LiPF₆/[LiBF₄ or LiN(SO₂CF₃)₂ or LiN(SO₂C₂F₅)₂] is from 70/30 to 99/1.

11. The nonaqueous electrolytic solution for lithium battery according to claim 1, wherein the nonaqueous electrolytic solution further comprises, in an amount of from 0.01 to 10% by mass, at least one S=O bond-containing compound selected from the group consisting of 1,3-propanesultone; ethylene sulfite; 1,2-cyclohexanediol cyclic sulfite; 5-vinyl-hexahydro-1,3,2-benzodioxathiol-2-oxide; 1,4-butanediol dimethanesulfonate; 1,3-butanediol dimethanesulfonate; divinyl sulfone; 1,2-bis(vinylsulfonyl)ethane; and bis(2-vinylsulfonylethyl) ether.

12. A lithium battery comprising a positive electrode, a negative electrode and a nonaqueous electrolytic solution according to claim 1.

13. The nonaqueous electrolytic solution for lithium battery according to claim 1, wherein $R^3$ represents hydrogen.

14. The nonaqueous electrolytic solution for lithium battery according to claim 1, wherein $R^3$ represents a methyl group.

15. The nonaqueous electrolytic solution for lithium battery according to claim 1, wherein $R^3$ represents a —$CH_2CO_2CR^{1'}R^{2'}C\equiv CH$ group.

16. The nonaqueous electrolytic solution for lithium battery according to claim 1, wherein each of $R^1$ and $R^2$ represents a hydrogen atom.

17. The nonaqueous electrolytic solution for lithium battery according to claim 1, wherein said carboxylate compound represented by formula (I) is 2-propynyl acrylate.

18. The nonaqueous electrolytic solution for lithium battery according to claim 1, wherein said carboxylate compound represented by formula (I) is 2-propynyl methacrylate.

19. The nonaqueous electrolytic solution for lithium battery according to claim 1, wherein said carboxylate compound represented by formula (I) comprises at least two members selected from the group consisting of di(2-propynyl)itaconate; 2-propynyl acrylate; 2-propynyl methacrylate; and 2-propynyl crotonate.

20. The nonaqueous electrolytic solution for lithium battery according to claim 1, wherein said carboxylate compound represented by formula (I) comprises at least three members selected from the group consisting of di(2-propynyl)itaconate; 2-propynyl acrylate; 2-propynyl methacrylate; and 2-propynyl crotonate.

21. The nonaqueous electrolytic solution for lithium battery according to claim 1, wherein said carboxylate compound represented by formula (I) comprises di(2-propynyl)itaconate; 2-propynyl acrylate; 2-propynyl methacrylate; and 2-propynyl crotonate.

* * * * *